United States Patent [19]

Ramos

[11] 4,088,275
[45] May 9, 1978

[54] RIBBON DISPENSER

[76] Inventor: Dennis Ramos, 255 Barham St., Santa Rose, Calif. 95401

[21] Appl. No.: 716,515

[22] Filed: Aug. 23, 1976

[51] Int. Cl.² ............................................. B65H 19/04
[52] U.S. Cl. .................................. 242/55.3; 242/137.1
[58] Field of Search .............. 242/55.3, 55.53, 129.62, 242/129.8, DIG. 2, 137.1, 137, 96; 57/13, 3, 77.4, 77.3; 19/288, 243, 246, 150; 43/42.53; 221/133

[56] References Cited

U.S. PATENT DOCUMENTS

| 476,883 | 6/1892 | Kuhn | 242/129.6 |
|---|---|---|---|
| 1,136,854 | 4/1915 | Wechsler | 242/129.62 |
| 2,141,248 | 12/1938 | McCurrach | 242/55.3 X |
| 2,479,710 | 8/1949 | Arnold | 242/137.1 |
| 3,353,210 | 11/1967 | Herring | 19/150 X |
| 3,942,736 | 3/1976 | Ramos | 242/96 |

Primary Examiner—Robert B. Reeves
Assistant Examiner—H. Grant Skaggs
Attorney, Agent, or Firm—Jack C. Munro

[57] ABSTRACT

A dispenser for a plurality of spools of ribbon wherein the spools are rotatably mounted within an open polygonal shaped frame having a plurality of interconnected sides. One lateral side of the frame is hingedly connected to the front side of the frame and is capable of hinging movement in respect thereto providing access to the spools for removal and replacement. The hingedly connected side includes a latching means to lock the device in a closed position. Each spool is mounted upon a shaft and upon each shaft is the resistance bearing assembly which keeps its respective spool from freely rotating. Flat ribbon which is wound upon each spool is conducted into a funneling device which includes a resisting device which presses against the ribbons and prevents the ribbons from being moved with respect to the funneling device when the device is not being used. Attached to the funneling device is a flat spout through which the ribbons pass which causes the ribbons to be dispensed in a flat alignment condition with respect to the frame at all times.

8 Claims, 6 Drawing Figures

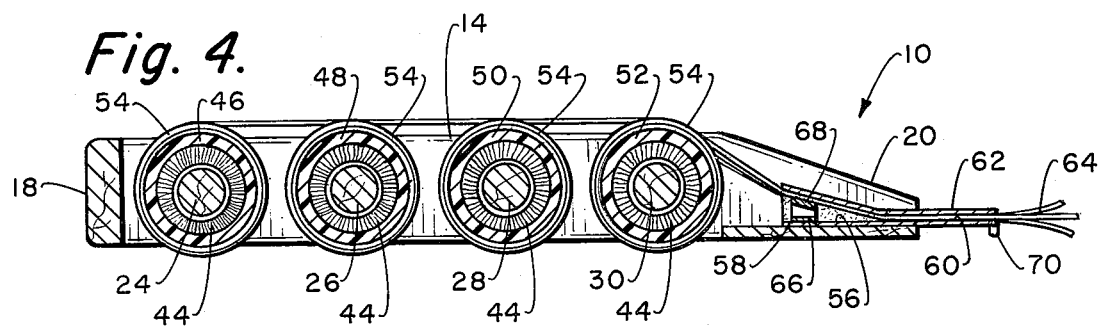
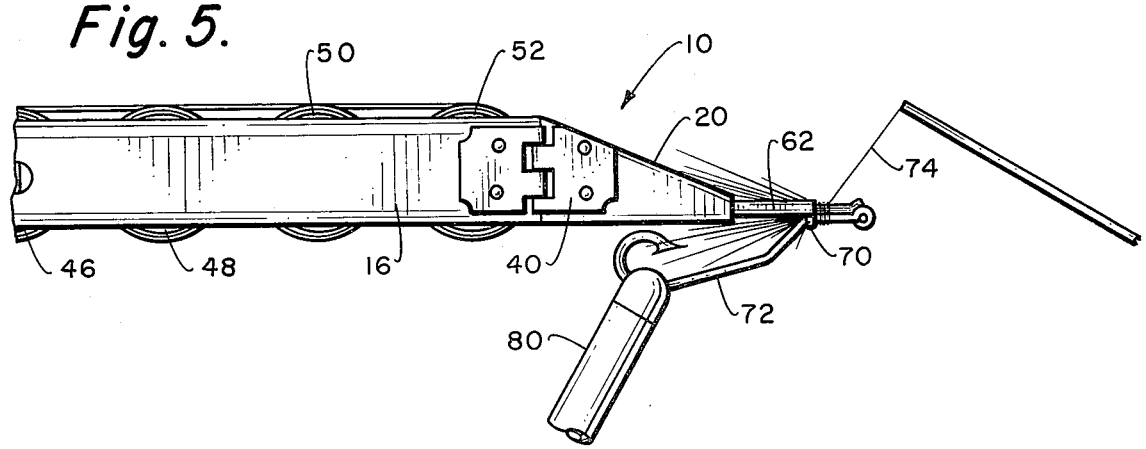
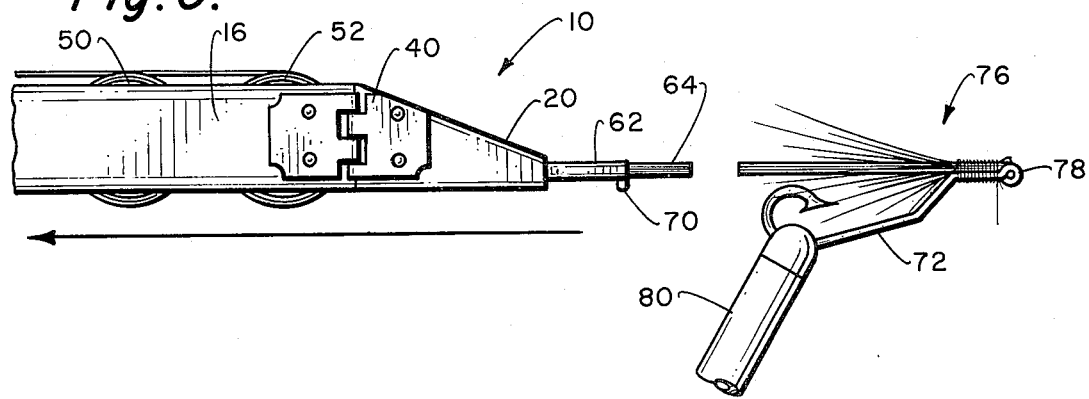

RIBBON DISPENSER

BACKGROUND OF THE INVENTION

The field of this invention relates to dispensers, and more particularly to a dispenser for ribbon, such as tinsel which is used in the tieing of flys for fishing.

A most common type of fishing relates to the use of a fly rod wherein a fish hook that is dressed to appear like an insect is cast upon the water, caused to remain a few seconds and then removed and then caused to be again cast upon the water. This procedure is continuously repeated in order to make the fly appear like a real insect so as to entice a fish to strike the fly.

The constructing of these flys is quite a tedious, time consuming procedure and also has become an art in itself. Some people spend long hours trying to construct a fly of a particular design which is believed will be readily sought after by fish.

These flys are usually constructed of tinsel. This tinsel is flat like a ribbon and is usually in the form of some bright color, such as gold, the tinsel may be wound upon a tiny little member of the fly several times and it is desired that this winding be such that the tinsel is not twisted. Also, the winding of it should be done at the same tension so that the tinsel will be tightly wound and will give a smooth appearance upon the fly. Such tinsel is usually supplied on a spool and it is difficult to accomplish these objectives by merely grasping the spool, removing a length of tinsel and winding the tinsel upon the fly.

Previously, there has known to be a ribbon dispenser to be used in the tieing of flys, such a dispenser being defined within U.S. Pat. No. 3,942,736, issued Mar. 9, 1976. However, the ribbon dispenser of the above-mentioned patent is only to dispense a single spool of ribbon. In the tieing of flys, there is frequently desired to employ several different colors of tinsel at the same time. Previous to the subject matter of this invention, there has been no known dispensing device which is capable of dispensing several different colors of tinsel at the same time in the constructing of flys.

SUMMARY OF THE INVENTION

This invention is believed to be summarily described within the Abstract Of The Disclosure and reference is to be had thereto.

The primary objective of this invention is to design a dispensing apparatus for a plurality of spools of tinsel which are to be dispensed and used simultaneously in the making of flys for fishing. The dispenser of this invention also facilitates dispensing of tinsel at an exact location and facilitates the winding of the tinsel about the to be constructed fly at the same tension.

BRIEF DESCRIPTION OF THE DRAWINGS

FIG. 4 is a cross-sectional view of the ribbon dispenser of this invention taken along line 4—4 of FIG. 1;

FIG. 5 is a view showing the device in use and in contact with a fish hook which is being constructed into the fly; and FIG. 6 is a view similar to FIG. 5 but showing the fly being completely constructed.

DETAILED DESCRIPTION OF THE SHOWN EMBODIMENT

Figure 1:
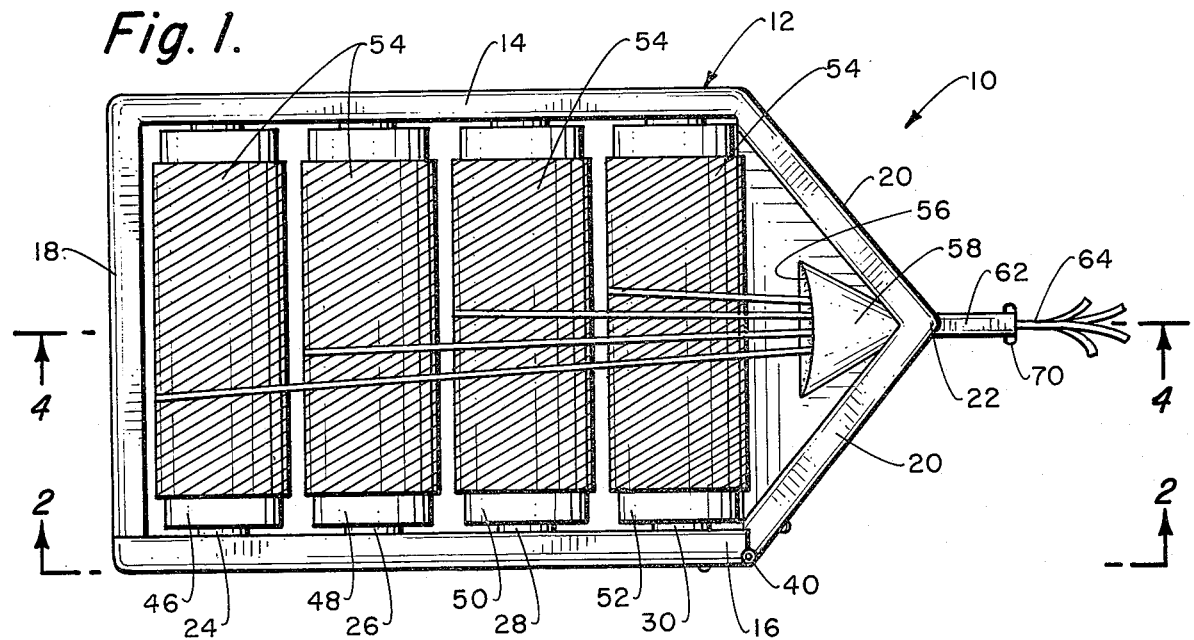
FIG. 1 is a plan view of the ribbon dispenser of this invention.
Figure 2:
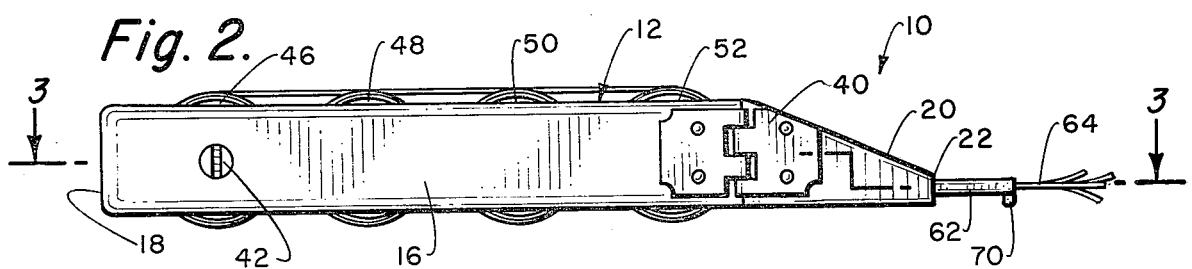
FIG. 2 is a side view of the ribbon dispenser of this invention taken along line 2—2 of FIG. 1.
Figure 3:
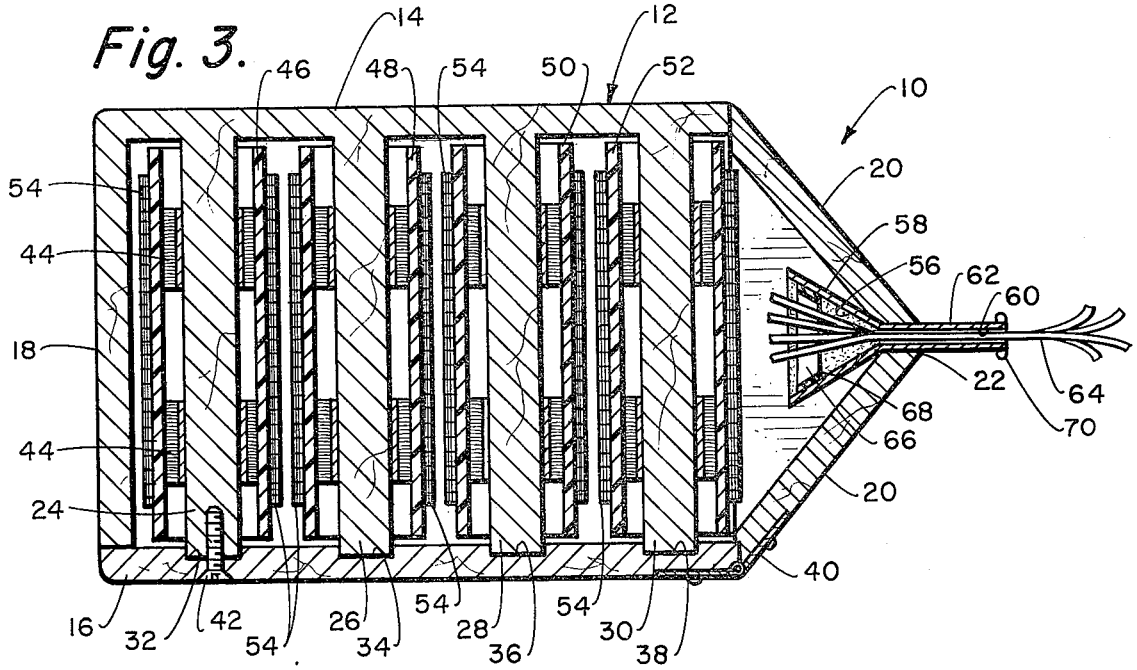
FIG. 3 is a cross-sectional view of the ribbon dispenser of this invention taken along line 3—3 of FIG. 2.

Referring particularly to the drawings, there is shown the ribbon dispenser 10 of this invention which is composed of a polygonal (substantially rectangular) shaped frame 12. This frame 12 includes lateral sides 14 and 16, a back side 18, and a front side 20. The front side 20 is formed V-shaped and forms an apex 22 at the middle thereof.

Within the open frame and integrally secured with the side 14 are shafts 24, 26, 28 and 30. The free end of each of these shafts fit within a corresponding recess 32, 34, 36 and 38 formed within the side member 16. The side member 16 is mounted for pivotal movement with respect to the frame 12 by means of hinge 40. The hinge 40 is mounted upon the forward side member 20.

A fastener 42 is connected with the side member 16 as to function to lock or fixedly position the side member 16 when in a closed position. The fastener 42 cooperates within an opening provided within the shaft 24.

Located upon each shaft 24, 26, 28 and 30 are a pair of resistance bearings 44. These resistance bearings are merely rings of material which are secured to their respective shaft. A material 44 can comprise any conventional type of material, but the synthetic nylon type of material which is commonly sold under the trade name of Velcro has been found to be preferable. However, it is considered to be within the scope of this invention that other type of material could be employed.

Rotatably supported upon the shaft 24 is a spool 46, with similar spools 48, 50 and 52 being rotatably supported upon their respective shafts 26, 28, and 30. Because of the rings of material 44, the spools are rotatably supported upon their respective shaft, but are not capable of free wheeling rotation. Located upon each spool 46, 48, 50 and 52 is a quantity of flat ribbon 54.

The free end of each of the quantities of ribbon 54 extend within the opening 56 of the funneling device 58. The funneling device 58 is secured to the front side 20.

Connecting with the opening 56 is a flat opening 60 formed within a flat spout 62. Within the opening 60 the ribbons come together forming an almost single strand 64.

When the device is not in use, it is desirable to prevent the ribbons 54 from becoming disassociated from the funneling device 58. To prevent this, a resisting device in the form of separate member 66 is employed which is placed within the opening 56. On the upper surface of the member 66 is a quantity of resilient material 68. When the device 66 is placed within the opening 56, the ribbons are located between the material 68 and the upper interior wall of the funneling device 58. This produces a slight binding or a frictional engagement of the ribbons which prevents the ribbons from being disassociated from the funneling device when the device is not being used.

Attached to the outer end of the flat spout 62 is a guide member 70. As shown in FIG. 5 of the drawings, the guide members 70 when the device is being used is to be placed upon the hook 72 which is being formed into a fly. The tinsel has been wound about the hook 72 and then the securing string 74 is then wound upon the ribbons securing such firmly to the hook 72.

When it is believed that there is sufficient amount of tinsel placed upon the hook 72, the operator merely cuts the strand 64 and the device is then ready to be reused.

It is to be understood that in the forming of the fly 76 that the tinsel will usually be wound adjacent the eylet 78 of the hook 72. Also, the hook 72 is to be supported upon a supporting post 80 as the tieing procedure is accomplished.

What is claimed is:

1. A ribbon dispenser comprising:
    a frame;
    a plurality of shafts supported by said frame;
    a spool rotatably supported on each said shaft, each said spool carrying a quantity of ribbon wound thereon;
    a single funneling device attached to said frame at one end thereof, said funneling device being tubular and having an elongated opening therethrough, the longitudinal center axis of said opening when extended intersects the substantial mid-point in length of each of said shafts, each of said ribbons to extend through said opening whereby said ribbons may be used in unison in the constructing of a fly for fishing.

2. The ribbon dispenser as defined in claim 1 wherein: said frame being polygonal in configuration and being formed of a plurality of separate sides, one of said sides being hingedly connected to another one of said sides, said hingedly connected side being movable about said hinge providing access to each of said spoons to effect removal and replacement, with said hingedly connected side in the closed position there being a locking means to fixedly position said hingedly movable side in said closed position.

3. The ribbon dispenser as defined in claim 2 wherein: said funneling device including a flat spout whereby said ribbons are conducted through said spout and dispensed in a particular alignment at all times.

4. The ribbon dispenser as defined in claim 3 wherein: each of said shafts includes a resistance bearing, said spool of each said shaft being in direct contact with said resistance bearing, whereby said resistance bearing functions to permit rotation of its respective said spool but prevents inertial movement of each said spool upon its respective said shaft.

5. The ribbon dispenser as defined in claim 4 wherein: said funneling device including a ribbon resisting device, said ribbons are in contact with said ribbon resisting device and places a continuous frictional drag upon said ribbons thereby preventing withdrawal movement of said ribbons from said funneling device during non-use of the device.

6. The ribbon dispenser as defined in claim 5 wherein: said resisting device comprises a separate member located within said funneling device, said separate member including a pad of resilient material, said ribbons to be located between said pad of resilient material and the inside wall of said funneling device.

7. The ribbon dispenser as defined in claim 1 wherein: said shafts being located parallel to each other, said funneling device including an elongated flat spout, the longitudinal access of said flat spout being transverse to the longitudinal axes of said spools.

8. The ribbon dispenser as defined in claim 7 wherein: there being four in number of said shafts and four in number of said spools.

* * * * *